Figure 1:
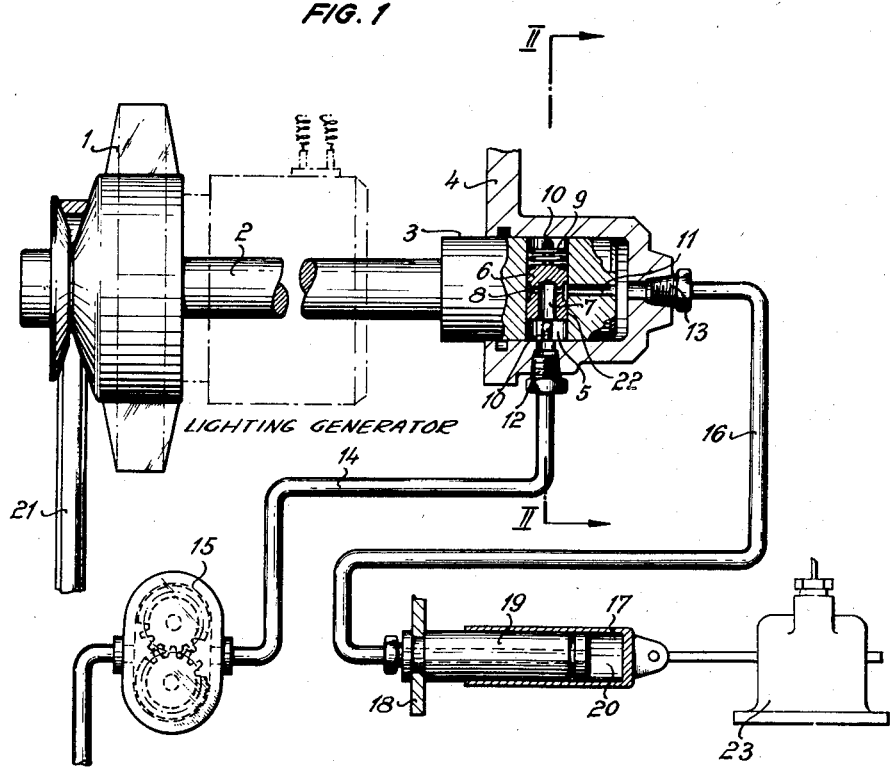

May 24, 1960   O. MAYR   2,937,628

AUTOMATIC STOP MECHANISM FOR INTERNAL COMBUSTION ENGINES

Filed Jan. 28, 1958

INVENTOR
OTMAR MAYR

BY *Dicke & Craig*

ATTORNEYS

United States Patent Office 2,937,628
Patented May 24, 1960

2,937,628

AUTOMATIC STOP MECHANISM FOR INTERNAL COMBUSTION ENGINES

Otmar Mayr, Plochingen, Neckar, Germany, assignor to Dr. Ing. h.c. F. Porsche KG, Stuttgart-Zuffenhausen, Germany Filed Jan. 28, 1958, Ser. No. 711,653

Claims priority, application Germany Feb. 26, 1957

12 Claims. (Cl. 123—41.15)

The present invention relates to an automatic stop mechanism for internal combustion engines, particularly those employing a belt-driven cooling air fan.

In order to avoid damage to, for instance, an unattended stationary engine as a result of the operational failure of the cooling fan due to the rupture of the drive belt or drive chain or any other suitable drive means which may be subject to rupture, engines in the past have been equipped with a tension sensing control device that acts on the drive belt. Such a device usually consists of a roller under spring tension which shuts off the fuel to the engine by way of a lever system if the fan belt breaks. Inasmuch as the belt drive in most cases not only drives the cooling fan but also auxiliary machinery, as for instance, lighting generators, compressors and the like, accommodation of the stop mechanism itself as well as the support members of the motion-transmitting linkage to the fuel injection pump, presents difficulties.

According to the present invention, these difficulties are avoided by a device connected with one of the rotating shafts of the engine which is responsive to the pressure of the lubricating oil and which, by means of an operating or actuating cylinder, affects one of the shut-off organs of the engine. As such, the stop mechanism may be arranged at any place on the engine whereby parts of the transmitting linkage, normally arranged on the outside of the engine where they are susceptible to damage, are avoided.

A simple arrangement ensues when the hydraulic device is connected with the shaft of the cooling air fan, that is, with the shaft of the lighting generator which also carries the fan impeller. The hydraulic device advantageously consists of a trunnion or shaft member connected with the fan shaft and a slide valve which is slidably arranged in a radially directed bore in the trunnion. The arrangement is so selected that the slide valve, under the effects of an annular spring, automatically oscillates about a predetermined central position to thereby keep open the flow of pressure oil to the operating cylinder. Additional loading of the fan shaft in an axial direction is avoided if the pressure oil enters into the hydraulic device in a radial direction and is discharged therefrom in an axial direction into the operating cylinder arranged remotely from the hydraulic device. The operating cylinder comprises a piston held stationary through which the pressure oil is carried into the working space formed between the piston and the operating cylinder.

Accordingly, it is an object of the present invention to provide an internal combustion engine having a belt-driven cooling fan which includes a stop mechanism that automatically stops the engine when the fan drive belt fails.

It is another object of the present invention to provide an internal combustion engine with an automatic stop mechanism that is operated hydraulically.

Still another object of the present invention resides in the provision of an automatic, hydraulically-operated stop mechanism for an internal combustion engine which is responsive to the rotation of a belt-driven shaft from the engine and the pressure of the lubricating oil thereof.

A further object of the present invention resides therein that the stop mechanism for the engine which is responsive to failure in the fan drive may be arranged anywhere on the engine and operative with any shut-off member of the engine without requiring a lever system for transmitting the shut-off motion from the failure sensing device to the stop mechanism at the engine.

It is still another object of the present invention to provide an internal combustion engine with an automatic stop mechanism which simultaneously prevent re-starting of the engine without first correcting the cause of the failure.

It is a further object of the present invention to provide an automatic stop mechanism for an internal combustion engine which is simple to manufacture, occupies a minimum of space and is reliable in operation.

Figure 2:
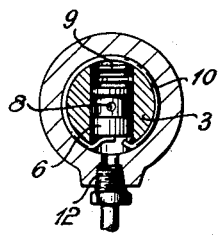

These and further objects, features and advantages of the present invention will become more obvious from the following description of an automatic stop mechanism for internal combustion engines in accordance with the present invention when taken in connection with the accompanying drawings which shows, for purposes of illustration only, one preferred embodiment in accordance with the present invention and wherein:

Figure 1 is a partial longitudinal cross-sectional view through the automatic stop mechanism and the associated operating cylinder according to the present invention, and Figure 2 shows a cross section through the stop mechanism taken along line II—II of Figure 1.

Referring now to the drawing wherein like reference numerals are used throughout the various views to designate like parts, reference numeral 2 designates a shaft which carries the cooling fan impeller 1 of an air-cooled internal combustion engine, not shown in details, and being connected with a shaft trunnion or shaft member 3 that rotates in the housing 4. The trunnion 3 is provided with a radially-directed bore 5 in which a slide valve 6 is slidably arranged. The slide valve 6 is provided with an axially directed bore 7 as well as radially-directed discharge openings 8 and is held in such a position by an annular spring 10 and an interposed compression spring 9 that the openings 8 are in coaxial relationship with an axially-directed bore 11 in the trunnion 3. The cylindrical housing 4 is provided with a radially-arranged pressure oil connection 12 and a connection 13 arranged coaxially with the axis of the shaft 2. The connection 12 is in communication with the lubricating oil pump 15 of the internal combustion engine through line 14 whereas the connection 13 is in communication with the operating cylinder 17 through a line 16. The operating cylinder 17 serves for adjusting a shut-off member of an internal combustion engine such as, for instance, the fuel pump in the present case. A piston 19, which is held stationary in an axial direction by a bracket 18, extends into the operating cylinder 17 and the pressure oil is carried through piston 19 into the working space 20 formed between cylinder 17 and piston 18.

*Operation*

With the engine in operation, the fan impeller shaft 2 which may be formed by the lighting generator shaft, is driven through a belt drive 21 whereby the shaft trunnion or shaft member 3 which may be connected, for instance, coaxially with shaft 2 or form an integral part thereof is also rotated. As a result of the centrifugal force, the slide valve 6 is forced outwardly against the tension of the springs 9, 10 and as a result of this movement, the control surface 22 of the slide valve 6 covers the bore 11 of the trunnion 3 so that the oil delivered by the pump 15 is blocked from flowing to the operating cylinder 17. Should the drive belt 21 break, the fan impeller shaft 2 and trunnion 3 will come to rest and the slide valve 6 is moved to its inner or neutral position with the help of the springs 9 and 10. Inasmuch as the pump of the lubricating system continues to deliver oil pressure, oil is brought into the bore 5 of the slide valve 6, through the line 14. From the bore 5 and oil flows through the discharge opening 8, the bore 11 and the line 16 into the working space 20 which causes the cylinder 17 to move and thereby automatically shuts off the fuel supply to the injection pump 23 and therewith the internal combustion engine itself.

As a result of the chosen construction of the present device, a safety device is simultaneously created because the engine cannot be re-started under the described conditions without first having repaired the damage. If shutting off the engine is done manually in a conventional manner, re-starting of the engine is possible at any time since the supply of pressure oil also stops when the engine comes to rest.

While I have shown one preferred embodiment of my invention, it is understood that the same is not limited thereto, but is susceptible of many changes and modifications within the scope of a person skilled in the art, and I intend to cover all such changes and modifications as encompassed by the appended claims.

It is possible, for instance, to provide a slide valve guided in an axial direction in place of the radially-arranged slide valve as shown which may be held in place by springs and acted on by spring-loaded members which are actuated by the action of the rotating fan impeller shaft.

I claim:

1. An automatic stop mechanism for an air cooled internal combustion engine operative to stop said engine upon failure of the cooling air supply thereto comprising fuel pump means, shaft means operatively connected with said engine and driven thereby, hydraulic actuating means operatively connected with said fuel pump means, a source of hydraulic medium, speed-responsive control means operatively connected with said shaft means to control the flow of hydraulic medium from said source to said actuating means so as to effect stoppage of said engine by said actuating means when the speed of said shaft means approaches zero.

2. An automatic stop mechanism for an air cooled internal combustion engine operative to stop said engine upon failure of the cooling air supply thereto having a a cooling air fan comprising fuel pump means, shaft means including a fan impeller operatively connected with said engine and driven thereby, hydraulic actuating means operatively connected with said fuel pump means, a source of hydraulic medium, speed-responsive control means operatively connected with said shaft means to control the flow of hydraulic medium from said source to said actuating means so as to effect stoppage of said engine by said actuating means when the speed of said shaft means approaches zero.

3. An automatic stop mechanism for an internal combustion engine according to claim 1, further comprising a belt for driving said shaft means from said engine.

4. An automatic stop mechanism for an internal combustion engine according to claim 1 wherein said shaft means includes a cooling air fan and a lighting generator armature.

5. An automatic stop mechanism for internal combustion engines according to claim 1 wherein said shaft means includes a cooling air fan, said control means including a shaft member positively connected with said shaft means and provided with a radially-directed bore, a slide valve slidably arranged in said bore and operative for movement to an outer position within said bore by centrifugal force upon rotation of said shaft means, said valve when in said outer position being effective to block the flow of hydraulic medium to said actuating means.

6. An automatic stop mechanism for an internal combustion engine according to claim 5 wherein said slide valve is resiliently suspended within said bore in a predetermined neutral position thereof under the tension of an annularly-shaped spring, said neutral position being such as to establish a free passage for said hydraulic medium to flow from said source to said actuating means when said shaft means is at rest.

7. An automatic stop mechanism for an air cooled internal combustion engine operative to stop said engine upon failure of the cooling air supply thereto, comprising fuel pump means, shaft means operatively connected with said engine and driven thereby, hydraulic actuating means operatively connected with said fuel pump means, a source of hydraulic medium, speed-responsive control means operatively connected with said shaft means to control the flow of hydraulic medium from said source to said actuating means so as to effect stoppage of said engine by said actuating means when the speed of said shaft means approaches zero, said control means including a shaft member positively connected with said shaft means and provided with a radially directed bore, a slide valve slidably arranged in said bore, said hydraulic medium entering said control means in the direction of said bore and being discharged therefrom in the direction of the axis of said shaft means.

8. An automatic stop mechanism for an internal combustion engine according to claim 1 wherein said actuating means comprises a stationary piston and a cylinder slidably arranged thereon and forming a working space therebetween, said cylinder being connected with said fuel pump means, said hydraulic medium being supplied to said working space through a bore in said stationary piston.

9. An automatic stop mechanism for an air cooled internal combustion engine operative to stop said engine upon failure of the cooling air supply thereto having a cooling air fan, comprising fuel pump means, shaft means including a fan impeller and a belt operatively connecting said engine with said shaft means, hydraulic actuating means operatively connected with said fuel pump means, a source of hydraulic pressure medium, speed-responsive control means operatively connected with said shaft means and communicating with said hydraulic source, said speed-responsive control means including a shaft member provided with a radially directed bore, a slide valve slidably arranged in said bore and operative for movement to an outer position within said bore by centrifugal force, said slide valve being resiliently suspended within said bore in a predetermined neutral position under the tension of spring means, said position of said valve being such as to establish a free passage for said hydraulic medium to flow from said source to said actuating means when the speed of said shaft means approaches zero.

10. An automatic stop mechanism for air cooled internal combustion engines according to claim 9, wherein said hydraulic medium enters said speed-responsive control means in the direction of said bore and is discharged therefrom in the direction of the axis of said shaft means.

11. An automatic stop mechanism for air cooled internal combustion engines according to claim 9, wherein said actuating means comprises a stationary piston and a cylinder slidably arranged thereon and forming a working space therebetween, said cylinder being connected with said fuel pump means, said hydraulic medium being supplied to said working space through a bore in said stationary piston.

12. An automatic stop mechanism for air cooled internal combustion engines according to claim 9, wherein said valve in said outer position is effective to block the flow of the hydraulic medium to said actuating means during rotation of said shaft means.

References Cited in the file of this patent

UNITED STATES PATENTS 1,740,259 Morrison _____ Dec. 17, 1929